US007916976B1

(12) United States Patent (10) Patent No.: US 7,916,976 B1
Kedikian (45) Date of Patent: Mar. 29, 2011

(54) FACIAL BASED IMAGE ORGANIZATION AND RETRIEVAL METHOD

(76) Inventor: Roland H. Kedikian, Glendale, CA (US)

( * ) Notice: Subject to any disclaimer, the term of this patent is extended or adjusted under 35 U.S.C. 154(b) by 1023 days.

(21) Appl. No.: 11/704,056

(22) Filed: Feb. 8, 2007

Related U.S. Application Data

(63) Continuation of application No. 11/544,994, filed on Oct. 5, 2006, now abandoned.

(51) Int. Cl.
*G06K 9/00* (2006.01)
(52) U.S. Cl. ............... 382/305; 382/118; 707/999.107; 707/915
(58) Field of Classification Search .................. None
See application file for complete search history.

(56) References Cited

U.S. PATENT DOCUMENTS

| | | | | |
|---|---|---|---|---|
| 6,606,398 | B2 * | 8/2003 | Cooper | 382/118 |
| 7,010,751 | B2 * | 3/2006 | Shneiderman | 715/232 |
| 7,043,474 | B2 * | 5/2006 | Mojsilovic et al. | 1/1 |
| 7,274,822 | B2 * | 9/2007 | Zhang et al. | 382/224 |
| 7,298,931 | B2 * | 11/2007 | Kim et al. | 382/305 |
| 7,343,365 | B2 * | 3/2008 | Farnham et al. | 715/853 |
| 7,486,807 | B2 * | 2/2009 | Nagahashi | 382/118 |
| 7,519,200 | B2 * | 4/2009 | Gokturk et al. | 382/118 |
| 7,551,755 | B1 * | 6/2009 | Steinberg et al. | 382/118 |
| 7,636,450 | B1 * | 12/2009 | Bourdev | 382/100 |
| 7,715,597 | B2 * | 5/2010 | Costache et al. | 382/118 |
| 7,716,157 | B1 * | 5/2010 | Bourdev et al. | 1/1 |
| 2002/0039447 | A1 * | 4/2002 | Shniberg et al. | 382/224 |
| 2002/0107973 | A1 * | 8/2002 | Lennon et al. | 709/231 |
| 2003/0210808 | A1 | 11/2003 | Chen et al. | |
| 2005/0197846 | A1 * | 9/2005 | Pezaris et al. | 705/1 |
| 2006/0239515 | A1 * | 10/2006 | Zhang et al. | 382/118 |
| 2007/0098303 | A1 * | 5/2007 | Gallagher et al. | 382/305 |

OTHER PUBLICATIONS

Veltkamp et al. (Oct. 2002) "Content-based image retrieval systems: a survey." State of the Art in Content Based Image and Video Retrieval, pp. 97-124.*
Kherfi et al. (Mar. 2004) "Image retrieval from the world wide web: issues, techniques, and systems." ACM Computing Surveys, vol. 36 No. 1, pp. 35-67.*
Pentland et al. (Jan. 1995) "Photobook: Content-based manipulation of image databases." Int'l J. Computer Vision, vol. 18 No. 3, pp. 233-254.*
Flickner et al. (Sep. 1995) "Query by image and video content: the QBIC System." IEEE Computer, pp. 23-32.*
Riya visual Search (2005). http://www.riya.com/.*
Lenssen, P. (Aug. 2006) "Google buys Neven Vision." http://blog.outer-court.com/archive/2006-08-15-n52.html.*
Graham, A. (Aug. 2006) "A better way to organize photos?" http://googleblog.blogspot.com/2006/08/better-way-to-organize-photos.html.*
Kedikian, Roland, First Office Action mailed Oct. 5, 2010 for U.S. Appl. No. 11/796,926, 12 pages.
Kedikian, Roland, First Office Action mailed Oct. 5, 2010 for U.S. Appl. No. 11/796,926, 11 pp.

* cited by examiner

*Primary Examiner* — Brian P Werner
*Assistant Examiner* — Barry Drennan
(74) *Attorney, Agent, or Firm* — Blakely, Sokoloff, Taylor & Zafman

(57) ABSTRACT

Embodiments of the invention include a system and set of processes for organizing image collections. The system detects individuals in each image uploaded into the system using facial recognition or similar methods. The user and viewers of the images may then view dynamic albums based on the interrelationships of individuals in images. Users and viewers may browse all images with an individual or see albums of images with two selected individuals or similar combinations based on the relationships between users.

21 Claims, 16 Drawing Sheets

Browser

315 | 317 | 319

Albums | Images | People in Images | Contacts:

ORGANIZE | PREFERENCES | ACCOUNT | MESSAGES
   321       323         324      327        329

| Name | Date | Location | Theme | Pictures | Status | Edit Album |
|---|---|---|---|---|---|---|
| Aruba-Vacation | 2006-05-01 | 2006-05-11-Aruba-Vacation | terasnaps | 198 | 1-PUBLIC | edit |
| Andy's BDay | 2006-04-15 | 2006-04-15-Andy's BDay | terasnaps | 59 | 2-GUEST | edit |
| 01-getting-ready | 2004-12-31 | 2004-12-31-New-Year\01-getting-ready | terasnaps | 94 | 1-PUBLIC | edit |
| 02-dancing | 2004-12-31 | 2004-12-31-New-Year\02-dancing | terasnaps | 27 | 1-PUBLIC | edit |
| 04-new-year | 2004-12-31 | 2004-12-31-New-Year\04-new-year | terasnaps | 86 | 1-PUBLIC | edit |
| Day-After | 2004-12-31 | 2004-12-31-New-Year\05-Day-After | terasnaps | 9 | 1-PUBLIC | edit |
| New-Year | 2004-12-30 | 2004-12-31-New-Year | terasnaps | 0 | 1-PUBLIC | edit |
| 03-santa-clause | 2004-12-30 | 2004-12-31-New-Year\03-santa-clause | terasnaps | 35 | 1-PUBLIC | edit |

Browser

Albums | Images | People in Images | Contacts

ORGANIZE | PREFERENCES | ACCOUNT | MESSAGES

| Name ▽ | Date ▽ | Pictures ▽ | Faces Organized | Faces Remaining | % Completed | People | Edit Images |
|---|---|---|---|---|---|---|---|
| Aruba-Vacation | 2006-05-01 | 198 | 118 | 18 | % 84.75 | organize | edit images |
| Andy's BDay | 2006-04-15 | 59 | 35 | | % 100.00 | organize | edit images |
| 01-getting-ready | 2004-12-31 | 94 | 191 | 2 | % 98.95 | organize | edit images |
| 02-dancing | 2004-12-31 | 27 | 34 | 2 | % 94.12 | organize | edit images |
| 04-new-year | 2004-12-31 | 86 | 149 | 2 | % 98.66 | organize | edit images |
| Day-After | 2004-12-31 | 9 | 9 | | % 100.00 | organize | edit images |
| New-Year | 2004-12-30 | 0 | 0 | 0 | - | organize | edit images |
| 03-santa-clause | 2004-12-30 | 35 | 57 | 4 | % 92.98 | organize | edit images |

Browser

Albums | Images | People in Images | Contacts

ORGANIZE | PREFERENCES | ACCOUNT | MESSAGES

800

| First Name | Last Name | Nick Name | Email | Images | Contacts | |
|---|---|---|---|---|---|---|
| Zee | G | Zee G | | 10 | edit | Images |
| Teresse | ? | Teresse ? | | 4 | edit | Images |
| Sogomon | M | Sogomon M | | 5 | edit | Images |
| Sime | m | Sime M | | 8 | edit | Images |
| Sevag Serge | G | Sevag Serge | | 10 | edit | Images |
| Serop | A | Serop A | | 18 | edit | Images |
| Sebou | A | Sebou A | | 17 | edit | Images |
| Sam | b | Sam B | | 7 | edit | Images |
| Roupen | G | Roupen G | | 4 | edit | Images |
| Rony | K | Rony K | | 10 | edit | Images |
| Roland | K | Roland K | rolandk_98@email.com | 43 | edit | Images |
| Roger | G | Roger G | | 8 | edit | Images |
| Robert | G | Robert G | | 8 | edit | Images |
| Raffi | B | Raffi B | | 7 | edit | Images |
| Raffi | G | Raffi | | 12 | edit | Images |
| Nichole | R | Nichole R | | 1 | edit | Images |
| Nella | K | Nella K | | 9 | edit | Images |
| Nareg | B | Nareg B | | 10 | edit | Images |
| Nanor | B | Nanor B | | 13 | edit | Images |
| Mark | G | Mark G Sr. | | 8 | edit | Images |
| Mark Jr. | G | Mark G Jr. | | 10 | edit | Images |
| Marie | G | Marie G | | 15 | edit | Images |
| Lerna | m | Lerna M | | 16 | edit | Images |
| Lena | B | Lena B | | 13 | edit | Images |
| John | G | John G | | 8 | edit | Images |
| Isabella | K | Isabella K | | 67 | edit | Images |
| Hourie | G | Hourie G | | 8 | edit | Images |
| Hourie | B | Hourie B | | 12 | edit | Images |
| Grace | A | Grace A | | 33 | edit | Images |
| Diana | R | Diana R | | 5 | edit | Images |
| Diana | G | Diana G | | 15 | edit | Images |
| Chris | S | Chris S | | 3 | edit | Images |
| Chantal | A | Chantal A | | 8 | edit | Images |

FACIAL BASED IMAGE ORGANIZATION AND RETRIEVAL METHOD

CROSS REFERENCE TO RELATED APPLICATIONS

The present invention is a continuation of co-pending U.S. patent application Ser. No. 11/544,994, filed Oct. 5, 2006, now abandoned and titled "Facial Based Image Organization and Retrieval Method."

BACKGROUND

1. Field

Embodiments of the invention relate to a method and system for organizing images such as digital photographs. Specifically, the embodiments relate to a system and method for organizing the images based on identified features such as faces within the images.

2. Background

The online storage and management of digital images has become an enterprise with many companies offering services that allow a user to upload and share digital images with other users. The services these companies offer are similar in nature. Typically these services allow a user to upload a set of pictures and organized them into sets that may each be labeled as albums.

The online services often have specialized local clients that must be installed before images can be uploaded to the servers. The local client manages the upload and may provide some limited image manipulation functionality such as image rotation or cropping. The online services typically provide a limited amount of storage for the images that are uploaded and limit the duration for which the images may be stored.

The organization of the uploaded images is limited to placing them in albums that may have titles and dates associated with them, but do not have any internal order except for a sequence of images assigned to the album.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 3 is a diagram of one embodiment of an interface for album listing.

FIG. 5 is a diagram of one embodiment of an interface for viewing an album organization overview.

FIG. 8 is a diagram of one embodiment of contact list for a user account.

DETAILED DESCRIPTION

In the following description, for the purpose of explanation, numerous specific details are set forth to provide a thorough understanding of the various embodiments. It will be apparent to one of ordinary skill in the art that the embodiments may be practiced without some of these specific details. In other instances, certain structures and devices are omitted or simplified to avoid obscuring the details of the various embodiments.

The following description and the accompanying drawings provide examples for the purposes of illustration. However, these examples should not be construed in a limiting sense as they are not intended to provide an exhaustive list of all possible implementations.

Figure 1:
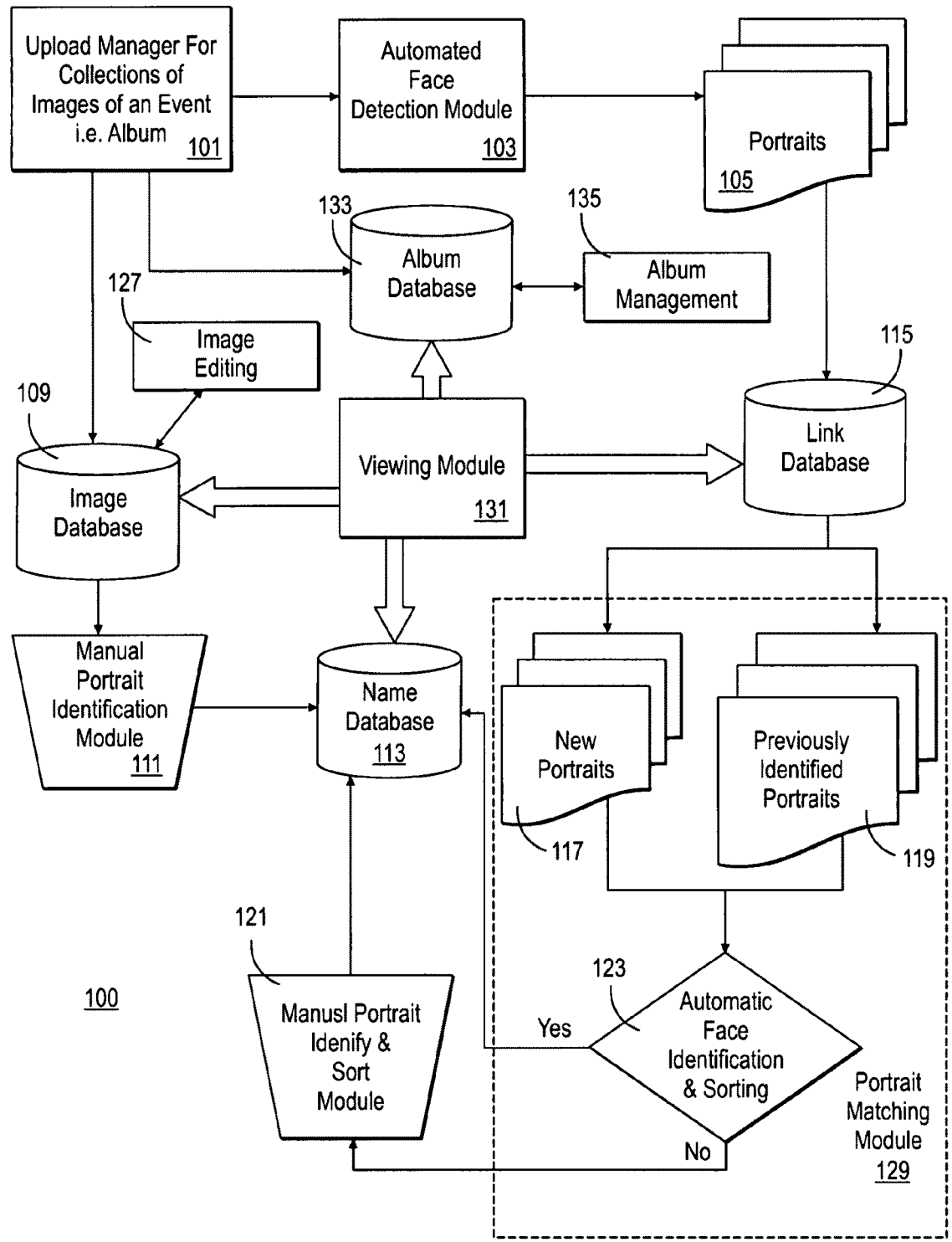
FIG. 1 is a diagram of one embodiment of an image management system.

FIG. 1 is a diagram of one embodiment of an image management system. In one embodiment, the image management system includes a set of databases, album management, face detection, identity linking, identify management, image editing, viewing and similar components and features. In one embodiment, these components, processes and features are provided as part of a remote server system. A user may access the system from a personal computer, workstation, console device, laptop, handheld device, cellular phone or similar device capable of accessing the servers over a network. In one embodiment, the user may access the system through a general purpose application such as a browser or similar application. In another embodiment, a specialized application may be utilized such as a browser modified for a handheld device, a purpose specific client or similar application.

In one embodiment, each user of a system may access the system resources through a personal or shared account. As used herein a user may refer to an individual with an account with the system. In contrast, a view, as used herein, may refer to an individual who is accessing the system to view images from a user's account. The user can upload pictures from the device he is accessing the system from or may send images on a physical media to an administrator of the system that may upload the images to the user's account. Each uploaded group of images may be identified as an album or event. As used herein an album may refer to an arbitrary collection of images. An album may also be related to an event, where each of the images in the album was captured during an identified event or in association with the event.

In one embodiment an upload manager 101 may handle the uploading of images into the system. The upload manager may facilitate the uploading of images from the device from which the user is accessing the system or an associated device. For example, a user may designate a set of images for upload on a personal computer as well as a set of images on a digital camera memory that is attached to the personal computer. The upload manager 101 organizes and manages the upload of these images to the system. The upload manager 101 may also obtain images provided to the system by an administrator. For example, a user may send the administrator of the system a memory card with images to be added to his account and an indication of the album or event that the images are to be associated with. As used herein an administrator of the system may refer to an entity and its agents such as a company that provides the system and services and its employees that administer the system.

The images provided to the system by the upload manager 101 may be stored in an image database 109. The image database 109 may be any type of database including a relational database, an object oriented database, or similar type of database system. The image database 109 may be responsible primarily for storing images uploaded to the system. The database may be housed in a single server or may be distributed and may have remote back up servers to guarantee the protection of the uploaded data.

Other data received with the images may be stored in an album database 133. This information may include a name for an album, times and dates for the images being uploaded, event information related to the uploaded images and similar information. The album database 133 may be any type of database including a relational database, and object oriented database or similar database. The album database 133 may be housed in a single server or may be distributed and may have remote back up servers to guarantee the protection of the uploaded data. An album management module 135 may be a stand-alone application or module integrated with the system as a whole. The album management module 135 may allow a user to manage data related to an album or event. This data may be associated with specific images or space multiple images.

In one embodiment, the upload manager 101 may also pass the uploaded images on to an automated face detection module 103. In one embodiment, the automated face detection module may utilize or include a cascade of boosted classifier working with haar-like features such as the OpenCV (Open Source Computer Vision) software by Intel Corporation, Santa Clara, Calif. The automated face detection module 103 may process each of the uploaded images to identify faces within each image. The automated face detection module 103 may search for all faces or similar features within each image. The automated face detection module 103 may detect any number of faces or similar features within each image and generate a portrait for each detected feature. For example, an image of a mother and daughter may be processed and the automated face detection module 103 may find two faces in the image and create a thumbnail or similar portrait for each face. These portraits 105 may then be forwarded to a link database 115 for storage.

In one embodiment, a link database 115 may further contain fields that are updated for linking portraits to identity, portraits to images and portraits to albums. The link database 115 may be any type of database system including a relational database, an object oriented database or similar database system. The link database 115 may be housed in proximity to image database 109 and other databases in the system. In another embodiment, the databases may be remote from one another. The databases may communicate with one another via a database management system, such as a relational database management system, over a network or over similar architecture. The link database 115 may be distributed over multiple machines and may be backed up to a remote location to protect the information stored in the database.

In one embodiment, a portrait matching module 129 may process the portraits in the link database 115 to match the faces to known identities. In one embodiment, the portrait matching module 129 may retrieve all portraits that have been previously identified 119 and all of the portraits that have been recently extracted 117 and attempt to identify and match the recently extracted portraits 117 withh previously identified portraits 119 using an automatic identification and sorting component 123. In one embodiment, all known portraits in the system may be used to identify newly received portraits. In another embodiment, only identified portraits associated with the account, or public portraits associated with the account or linked accounts or similar portraits are utilized to match the newly received portraits. In a further embodiment, a user or administrator may further limit the pool of previously identified portraits. For example, the user may specify portraits identified with a particular album, event or set of albums or events.

In one embodiment, the automatic portrait matching module 129 may utilize Principle Component Analysis (PCA) a.k.a. Eigenfaces, a combination PCA and Linear Discriminant Analysis (PCA+LDA) or Bayesian Intrapersonal Extrapersonal Classifier (BIC). The automatic portrait matching module 129 may also update the link database 115 to include the matching information between a portrait in the link database and an identity in the identity database.

In one embodiment, the character information may be stored in an identity database 113. Identity database 113 may be any type of database including a relational database, object oriented database or similar database system. Similar to the other databases, this database may be distributed, remote, networked or have similar architectural features. The identity database 113 may store data related to identities of individuals. As used herein an individual in an image may be referred to as a character and a set of characters associated with an album may be referred to as a cast of characters. Data related to a character that may be stored in the identity database 113 may include name, relations with other characters (e.g., mother, wife, daughter etc.), account information, public or private settings, portraits in the link database 115, full images in the image database 109, associated albums in the album database 107 and similar data.

In one embodiment, portraits that are not identified may be processed by a manual portrait identify and sort module 121. The manual portrait identify and sort module 121 may generate an interface for a user to view a full set or subset of the portraits that were not matched. The manual portrait identify and sort module then receives identity information from the user and updates the link database of that portrait entry to link it to the identity database as identified by the user and stores the information in the link database 115.

In one embodiment, the system may include a manual portrait identification module 111. In some cases, the face detection module 103 may not recognize or identify each of the faces in an image. For example, an image may include a partially obscured face that is not identified as a face. A user may initiate the manual portrait identification module 111 to correct this type of error. The manual portrait identification module 111 may be used to create a portrait, link an image with an identity or similarly update the system information and link an image in the image database 109 with an identity of a character in the image in the identity database 113 by updating the link database 115

In one embodiment, the system may further include a set of utilities for managing data in the system. An image editing utility 127 may provide an interface to allow a user to edit images that have been stored in an image database 109. The image editing utility 127 may allow a user to rotate, crop, airbrush, paint, or similarly edit images stored in the image database 109.

In one embodiment, the system may further include an album management utility 125. The album management utility 125 may provide an interface to allow a user to edit information and the images that constitute an album. The album management utility 125 may provide tools for moving images between albums, creating new albums, deleting albums, linking albums with other albums, users or events, sharing albums and similar tools. The album management utility 125 may update the album management database 107 or other databases as needed based on user input from the provided tools.

In one embodiment, the system may include an identity management utility 129. The identity management utility 129 may provide an interface and set of tools to manage the identity of characters associated with stored images and portraits. The tools may include interfaces for inputting and editing identity information including personal information such name, email, relation and similar information. The tools may also allow a user to select which images and portraits are associated with the character.

In one embodiment, the system may include a viewing module 131. The viewing module 131 may provide an interface to access each of the databases to provide a range of services to a user including allowing a user to view an album, images and character information. The viewing module 131 may allow a user to view relationships between individuals through the presentation of images and portraits. The viewing module 131 may provide several interfaces for viewing and editing the relationships between individuals and events in the images of an album or account. These interfaces are discussed in greater detail in regard to the following figures. Each of these interfaces may be generated and provided through a web server or similar service to be accessed by a browser.

Figure 2A:
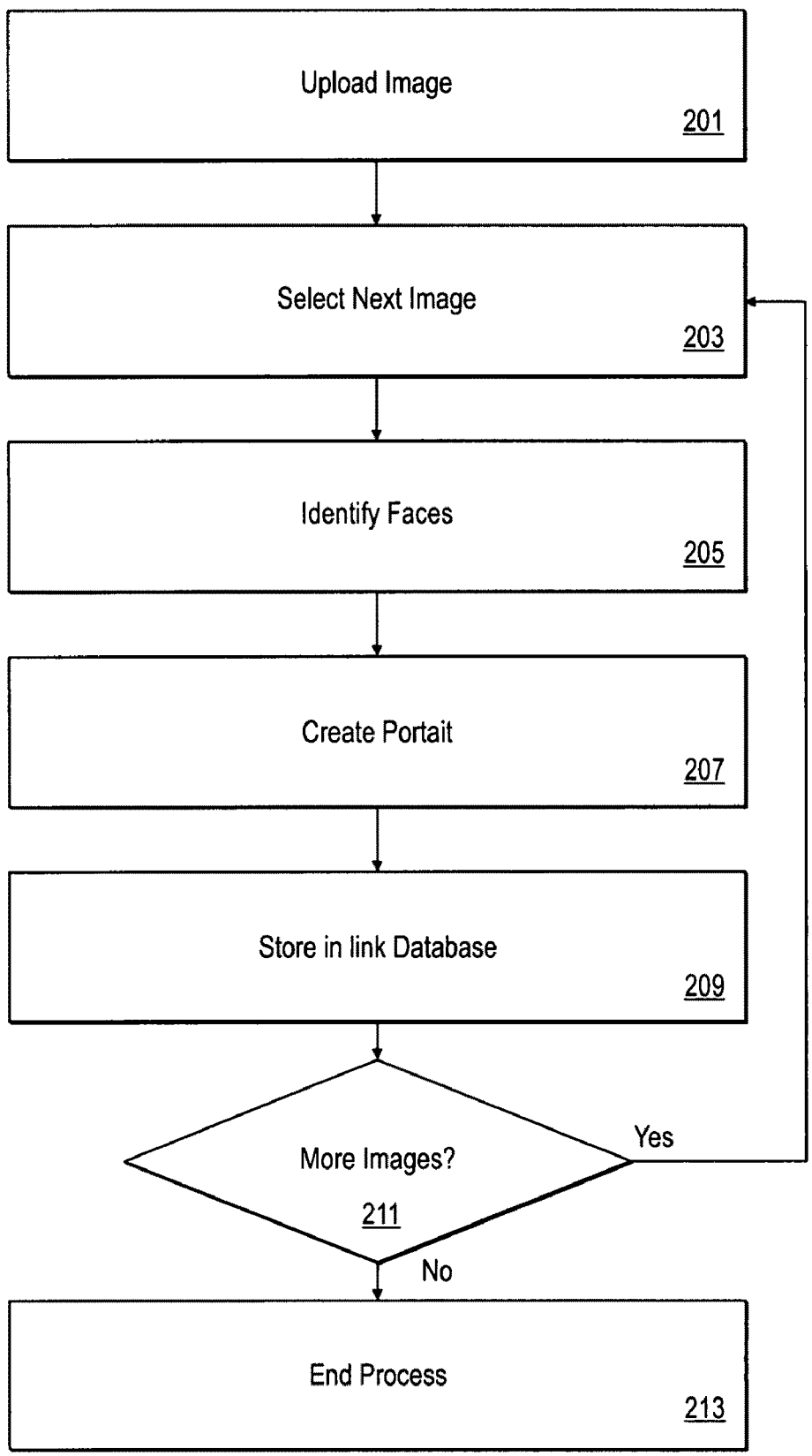
FIG. 2A is a diagram of one embodiment of a process for face recognition for uploaded images.

FIG. 2A is a diagram of one embodiment of a process for face recognition for uploaded images. In one embodiment, the system may initiate its processing of images during an upload of the images into the system (block 201). The upload process may be between a local client such as through a browser interface or at the remote server through a server application utilized by an administrator or through a similar process. The images may be input in the system in any format. The images may be stored in computer readable media such as fixed disks, tape drives or similar storage media. The data may be formatted and organized to be stored in a database or set of databases such as an image database.

In one embodiment, the system may process the images one at a time or may process the images in batches or in parallel. The system may select a next set or individual image to process (block 203). The images may be processed in a first in first out manner, may be selected based on available resources or similarly processed. For example, some images may be larger or at a higher resolution and more computationally intensive to process. The system may distribute the processing of these images or similarly allocate resources to the processing of uploaded images.

In one embodiment, the received images may be processed to detect faces or similar elements in the images (block 205). The images may be of a character or set of characters. The system attempts to identify each of the characters in the images to allow the user to view the images based on the character being present and to easily see relationships between characters in a set of images. The system may identify the individuals by their faces using PCA or similar techniques. In another embodiment, other features may be used to detect characters including, clothing (e.g., a hat) or other distinguishing features (e.g., hair, scars, glasses, etc.). In further embodiments, the system may be used to detect and categorize items other than characters. For example, the system may be used to detect and/or identify animate or inanimate objects. The same types of relationships between items may be drawn for these items as are determined for characters. For sake of clarity, the embodiments described herein relate to the identification of .characters.

In one embodiment, the process may find a single face or a set of faces in each image. The process may create a separate portrait for each of the faces. A portrait may be a cropped area of the image, a thumbnail or similarly reduced image. The portrait may be framed to include the user's face, upper body or whole body. The portrait may be created in any format including a GIF, JPEG or similar format.

The portraits may be stored in the link table (block 209). The portraits may be stored along with contextual information and link information. For example, the portraits may be stored with information indicating the image they were extracted from, an event or album associated with the image, information about other portraits and similar information. This data may be organized to fit a schema of a database or into objects for an object oriented database.

In one embodiment, the process may check if additional images or sets of images are available to be processed (block 211). If there are additional images to be processed, then the next set or image may be selected (block 203). If no other images are available to be processed the process may idle until more images are input or the process may exit or end (block 213).

In one embodiment, this process may be executed or supported by the upload manager discussed in regard to FIG. 1.

Figure 2B:
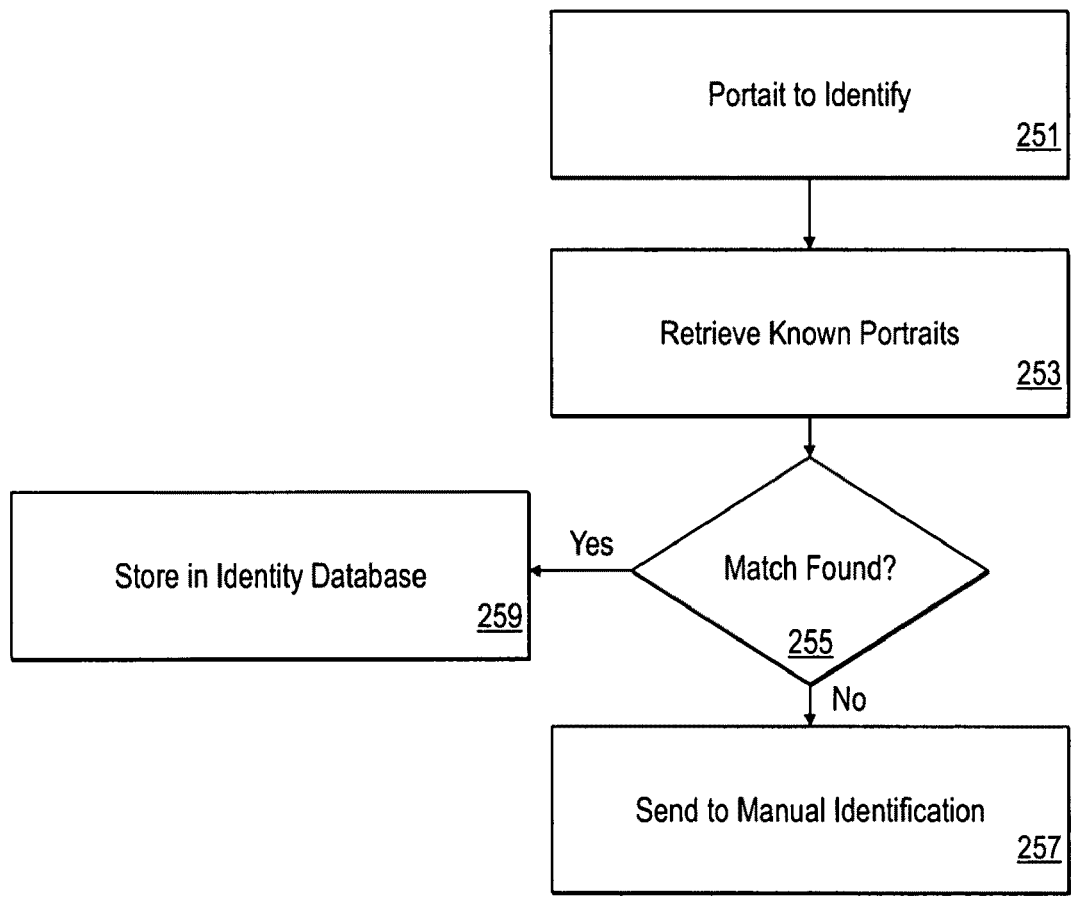
FIG. 2B is a diagram of one embodiment of a process for portrait matching.

FIG. 2B is a diagram of one embodiment of a process for portrait matching. In one embodiment, the portrait matching process may be initiated when new portraits are generated or may run continuously waiting for new portraits to be stored in the link database for processing (block 251). The process may process new portraits one by one or in sets from the link database to start the matching process. The portrait matching process may access a set of previously identified portraits from the link database and may obtain identity information for each of the identified portraits from the identity database (block 253). Each new portrait may be compared to each identified portrait iteratively or the new portrait may be scored, or similarly processed to generate an abstracted value or set of values associated with the new portrait. This data may be compared with similar data for identified portraits (block 255). A group of previously identified portraits for the same character may be averaged together for purposes of comparison with the new portrait.

In one embodiment, if the new portrait is a match with a previously identified portrait based on identification of similar features or similar scoring of the portraits then the new portrait may be considered a match. If a complete search is made and no match is found then the new portraits may be forwarded to the manual identification module to be identified (block 257). If a match is found during the search then the information related to the new portrait may be updated in the link database with information from the identity database (block 259). For example, identity information may be modified to add another link to an associated picture and to further define a set of images associated with a character. After a portrait has been processed the process may check to determine if there are addition images to be processed (block 257). If there are not any further portraits to process the portraits matching process may idle and wait for more input or may exit or end. If there are additional portraits to be processed, then a next set of portraits may be selected for processing and the process reinitiated (block 251).

FIG. 3 is a diagram of one embodiment of an interface for showing an album listing. In one embodiment, the interface may be generated as a web page or extensible markup language (XML) document for display through a web browser or similar application. In another embodiment, the interface may be a part of a specialized application or similar client.

In one embodiment, a user may log into his account through a standard log in process and be provided with a set of navigation links and content through the interface. For example, the interface may provide a set of navigation links related to organization 323, preferences 325, account information 327 and messages 329. These navigation options may be a high level set of options that are always or nearly always available when navigating the interface. The organize link 323 may provide access to other interfaces related to the organization of images, albums or identities. The preferences link 325 may provide access to a preferences interface that allows a user to set display preferences, navigation preferences and similar preferences related to the system. The account link 327 may provide access to information about the user's account including password and login information, account billing status, order status for purchases through the interface and similar information. The messages link 329 may provide access to an interface for a system email interface or similar communication interface for sending and receiving messages from the system administrators and other users.

A set of additional navigation links that may be page or interface specific may also be provided. For example, in an album overview interface links may be provided to albums 315, images 317, people in images 319, contacts 321 or similar links. The albums link 315 may provide access to the album overview listing 300 or similar album related interfaces. The images link 317 may provide access to image editing and viewing interfaces. The contacts link may provide access to contact list viewing and editing interfaces.

In one embodiment, the interface may present an album overview listing 300. The album overview listing 300 may provide a table or similar layout of information relating to the albums of the user stored within the system. The table or similar layout may provide a list of album names 301, the date on which the album was created 303, a location or description associated with an album 305, a theme of the album 307, the number of pictures 309, a sharing status of the album 311 and similar information.

Some information about the album may be automatically collected and updated. For example, the number of pictures 309 in an album may be tracked by the system and provided automatically. Other information is determined by the user at the time the album is created. For example, a user may designate the theme and sharing status of the album when created. A theme may be a layout scheme or similar organizational scheme for viewing or accessing the album information including images. The system may provide a number of preset themes for the user to choose from. The sharing status is an indication of which viewers may have access to the album. The user may restrict access to specifically designated viewers or defined groups of viewers, to just the user, or may make the album publicly accessible.

Figure 4:
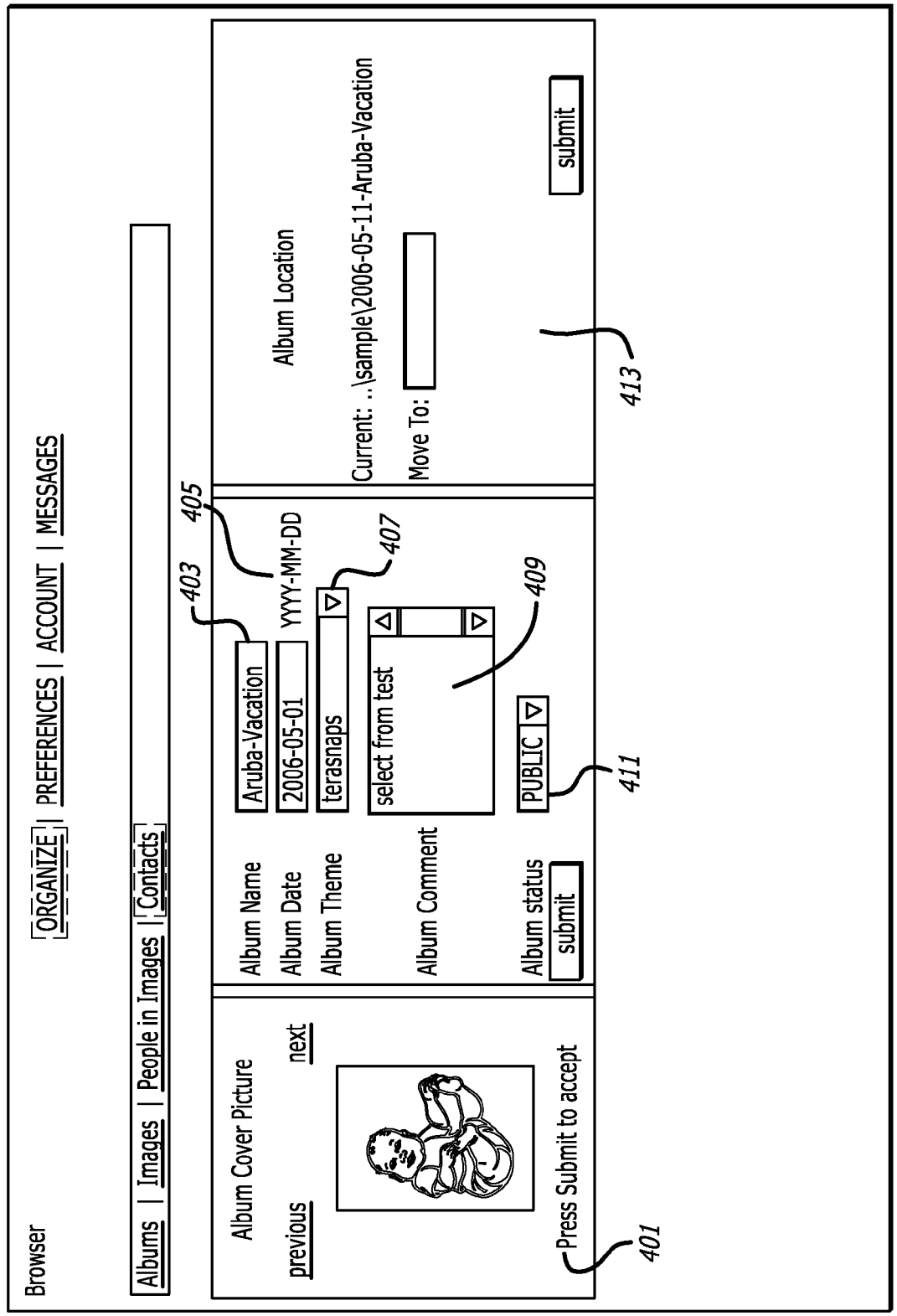
FIG. 4 is a diagram of one embodiment of an interface for album editing.

An edit option 313 may be provide to allow the user to change descriptive information and characteristics of the album. FIG. 4 is a diagram of one embodiment of an interface for album editing. In one embodiment, the album editing option may be used to access an album editing interface 400.

The album editing interface 400 may provide the user a set of graphic user elements or similar interface for viewing and changing the characteristics and information related to an album.

In one embodiment, the album editing interface 400 may allow a user to select an album cover image 401. The image selection element 401 may allow a user to see a thumbnail or similar representation of images in an album. The user may cycle through these images to select a desired image to represent the album. In another embodiment, a separate interface such as a pop up window may be presented to show all available images for selection.

In one embodiment, text windows, drop downs, radio buttons and similar input mechanisms may be used to allow a user to specify an album name 403, an album date 405, album theme 407, comments 409 and album sharing status 411 and similar characteristics of the album. In one embodiment, a user may view and update a location 413 where the images are stored on a local drive to initiate an upload process or a synching process. A synching process may check the local storage device to see if new images for the album have been added. The interface may allow a user to update the location information 413.

FIG. 5 is a diagram of one embodiment of an interface for viewing an album organization overview. In one embodiment, an interface may be provided to show an overview of the organization of the albums of the user. In another embodiment, this overview may be combined with other album overview information.

The album organization overview information may include the album name 501, the album date 503, the number of pictures in the album 505, the number of faces recognized and matched with an identity in the images of the album 507, the number of unmatched faces 509, a completion statistic 511 (e.g., the percent of matched faces from the total number of recognized faces) and similar information. The album organization overview may also include links to a people organization interface 513, an image editing interface 515 and similar information or interfaces.

Figure 6:
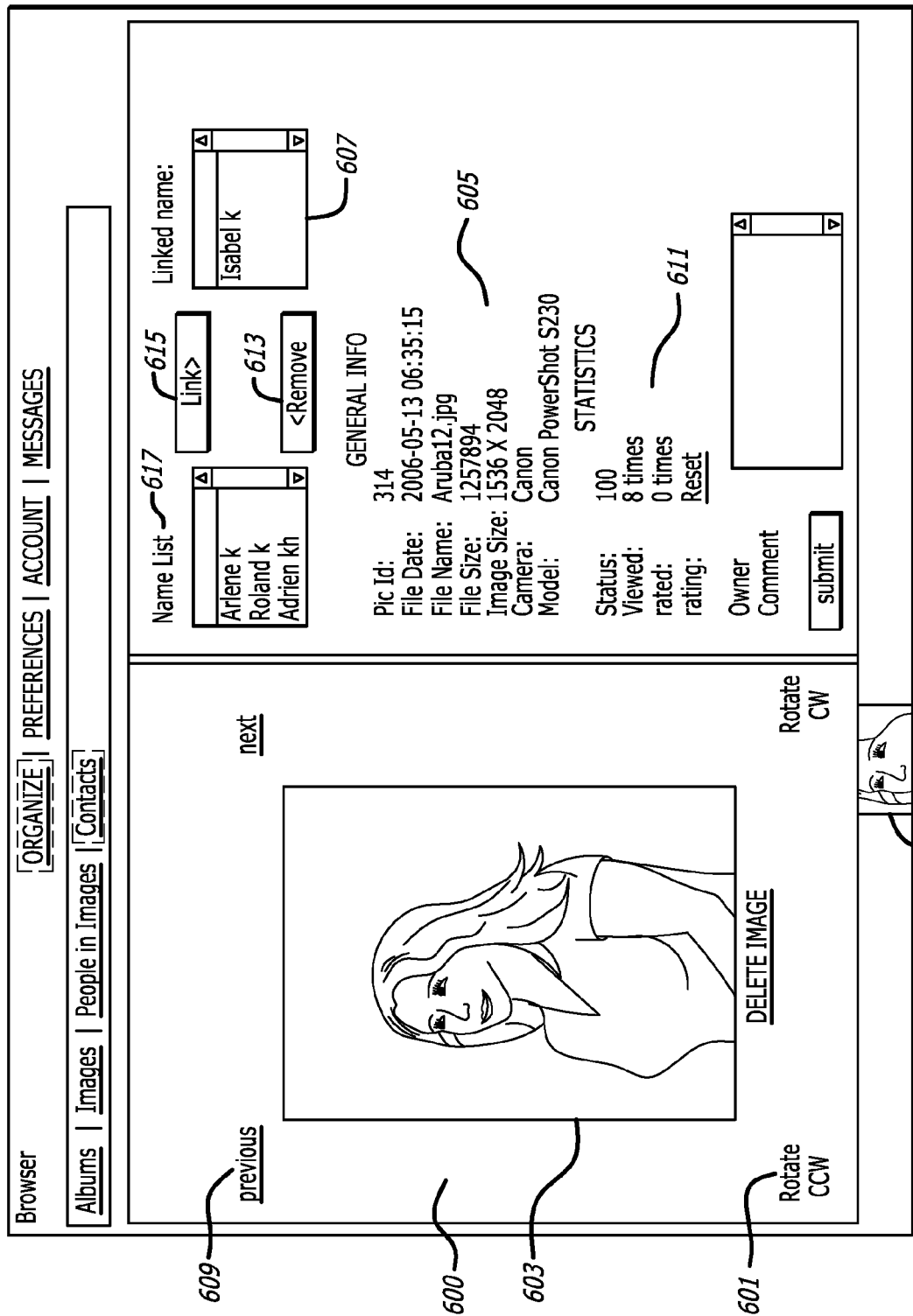
FIG. 6 is a diagram of one embodiment of an interface for image editing.

FIG. 6 is a diagram of one embodiment of an interface for image editing. In one embodiment, this interface may be reached from the album organization overview through the image edit button. The image editing interface allows a user to make changes to an image and manage the information related to the image.

In one embodiment, the image editing interface 600 may display an image 603 to be edited. The image editing interface 600 may provide a set of tools 601 for editing the image 603. The tools may include rotation of the image, resizing of the image, airbrushing, color adjustment and similar image editing tools. The user may also use the interface to cycle through the images of an album or other sets of images associated with a user account using image navigation links or tools 609.

In one embodiment, the image editing interface 600 may also display information about the image including image characteristics 605 such as an image identification number, image file date, image file name, image file size, image dimensions, GPS location, type of imaging device that generated the image and similar information that are in an EXIF portion of all digital images. The image editing interface 600 may also provide information about the usage of the image including statistics 611 on the number of times the image has been viewed, ratings, shared status, comments and similar information.

In one embodiment, the image editing interface 600 may also be used to manage the characters that are linked to the image. These are the characters that are pictured in the image.

In one embodiment, the automatic processing of the image during upload may have matched the faces in the image to characters that are already known. The known characters may be listed as linked names 607. The interface may allow the user to remove 613 or add 617 names 617 as necessary to correct errors or oversights of the automated detection and matching processes.

In one embodiment, each portrait 608 associated with the image may be displayed. The portraits may be associated with the linked characters associated with the image.

Figure 7:
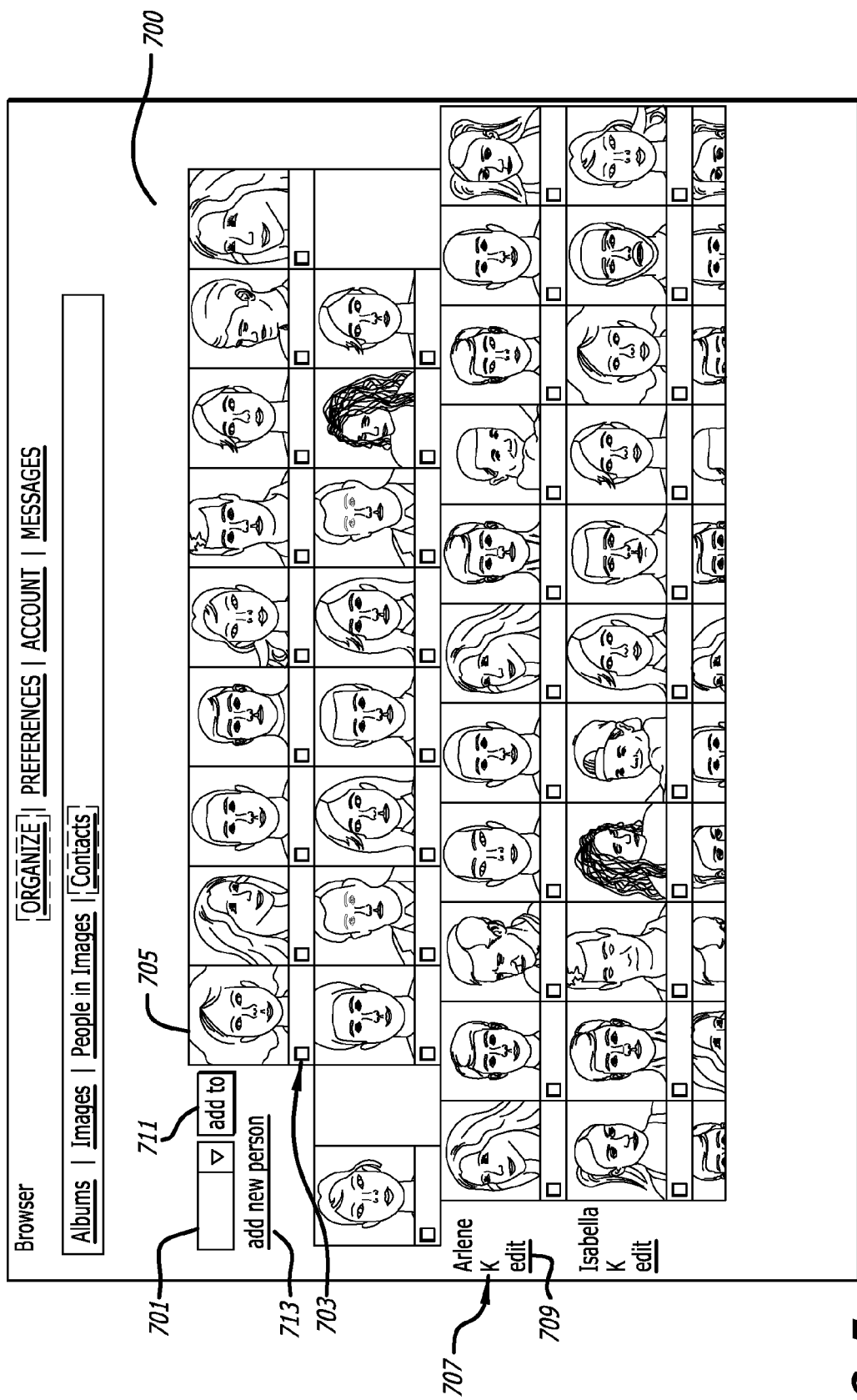
FIG. 7 is a diagram of one embodiment of an organization interface for editing unmatched and matched portraits.

FIG. 7 is a diagram of one embodiment of an organization interface for editing unmatched and matched portraits. In one embodiment, the organization interface 700 may be used to edit the matching of portraits to identities.

In one embodiment, the organization interface 700 may display all or a subset of the portraits 705 that were detected in the uploaded image but not matched with a character. The organization interface may also display all or a subset of the images or portraits 709 associated with each character known to the user or the album. The user may utilize the organization interface 700 to match portraits to characters. For example, the user may select a character from the individual selection element 701 and select each of the unmatched portraits that correspond to the character by clicking on the portrait, a check box 703 for the portrait or similar element and selecting a confirm or add button 711. A new character may be defined by selection of an add new character or person element 713.

In one embodiment, the organization interface 700 may also be used to edit the set of characters and their portraits already matched with an identity. A user can add, remove or reassociate portraits using an edit user interface element 709. The edit user interface element may bring up the image editing interface discussed above in regard to FIG. 6 or a similar interface.

FIG. 8 is a diagram of one embodiment of contact list for a user account. In one embodiment, the system may provide an interface 800 for viewing a list of characters associated with the user account. This list of characters may be a list of friends, family, acquaintances or similar individuals known to a user. These characters may appear in the images and albums of the user.

In one embodiment, the contact list interface 800 may have a table layout or similar layout. The interface 800 may display the character's name 801, including last and first name, a nickname 803, email address 805 or other address or contact information (e.g., phone number, work number, home number, etc.), a number of images of the portraits associated with the account or public images of the character across multiple accounts and similar information. In one embodiment, the contact interface 800 may include elements 809 linking the characters in the list to a character contact editor and a presentation of images associated with the character or other interfaces of the system.

In one embodiment, the character contact information may be used to detect and link characters between different user accounts. The system may detect matching contact information such as matching email addresses that allow the system to determine that there is a match between characters across user accounts. This information may be used to find publicly available or user accessible images of the character in the other account and include them in the generation of dynamic albums or determination of relationships of images between the accounts.

Figure 9:
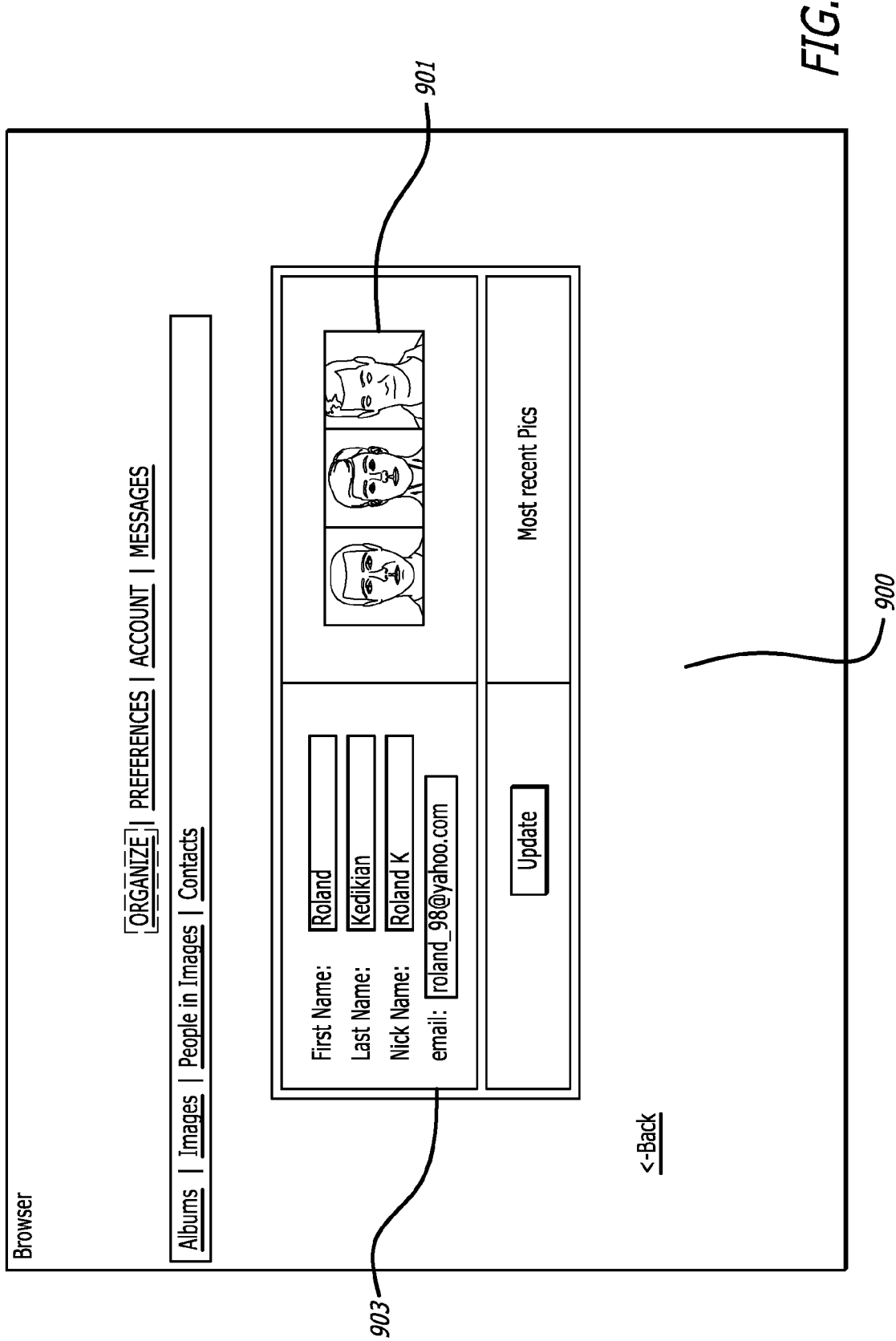
FIG. 9 is a diagram of one embodiment of a character contact editor.

FIG. 9 is a diagram of one embodiment of a character contact editor. In one embodiment, a character contact editor 900 may be reached from other interfaces (e.g., from the contact list interface) to allow a user to update the personal information associated with a character. In one embodiment, the individual contact editor 900 may provide a set of text fields or similar user interface elements 903 to allow a user to update the name, nickname, email address and similar contact information for a character.

In one embodiment, the character contact portraits may be displayed or a subset of the portraits or images of the character may be displayed (e.g. recently added portraits). A user interface element may be provided to link the character contact editor 800 to the image editing or the organization interfaces to modify the associated images and portraits.

Figure 10:
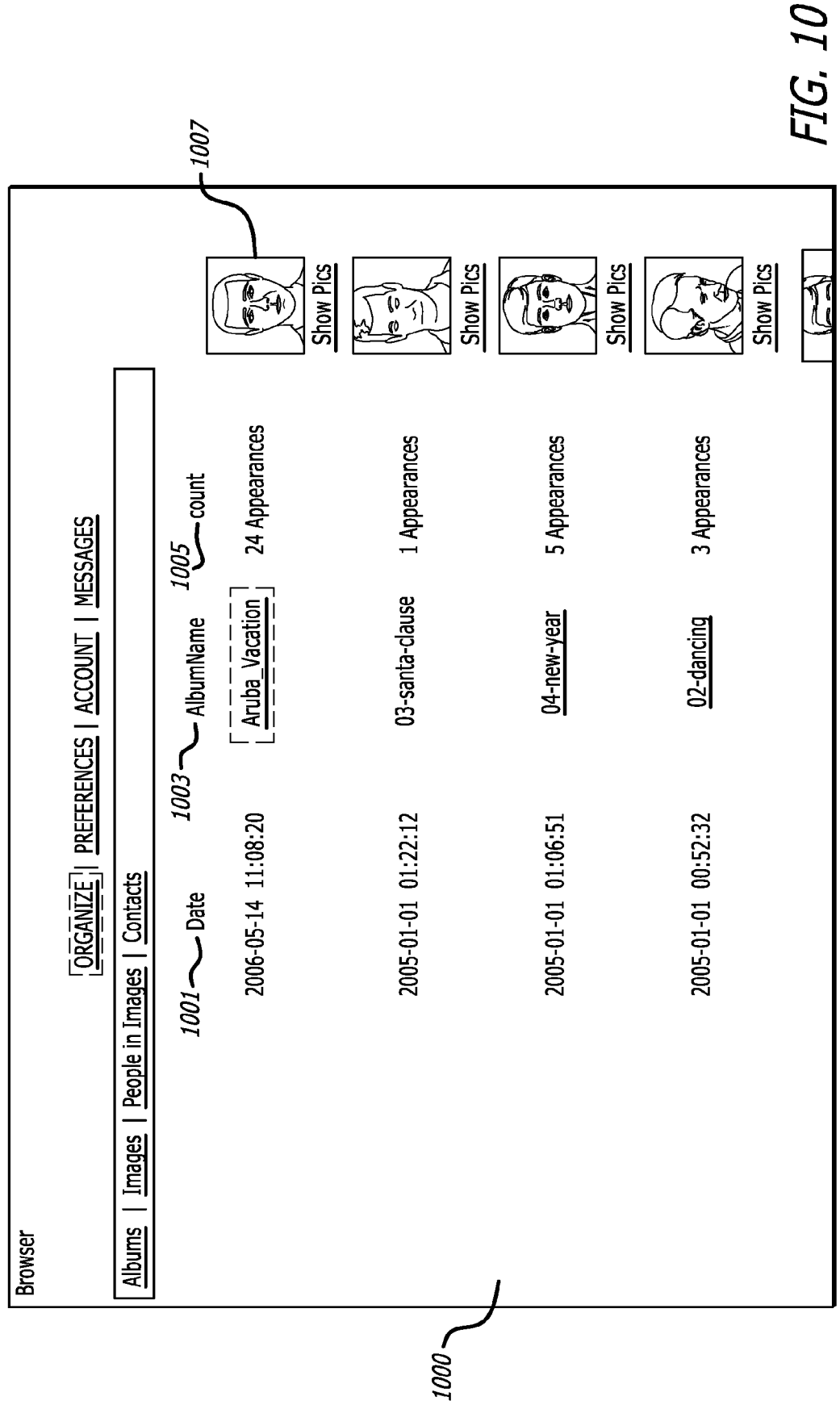
FIG. 10 is a diagram of one embodiment of a character images listing.

FIG. 10 is a diagram of one embodiment of a character images listing. In one embodiment, a character images listing interface 1000 may be reached through the character contact listing interface or character contact editor or other interfaces. In one embodiment, the character images listing interface 1000 may display information related to the images of a character including date of a related album 1001, an album name 1003, number of images of the individual 1005, a user interface element to link to the images 1007 or similar information and elements. In one embodiment, a thumbnail or similar representative image such as a portrait from the set of images may be shown as a representative image from the album.

Figure 11:
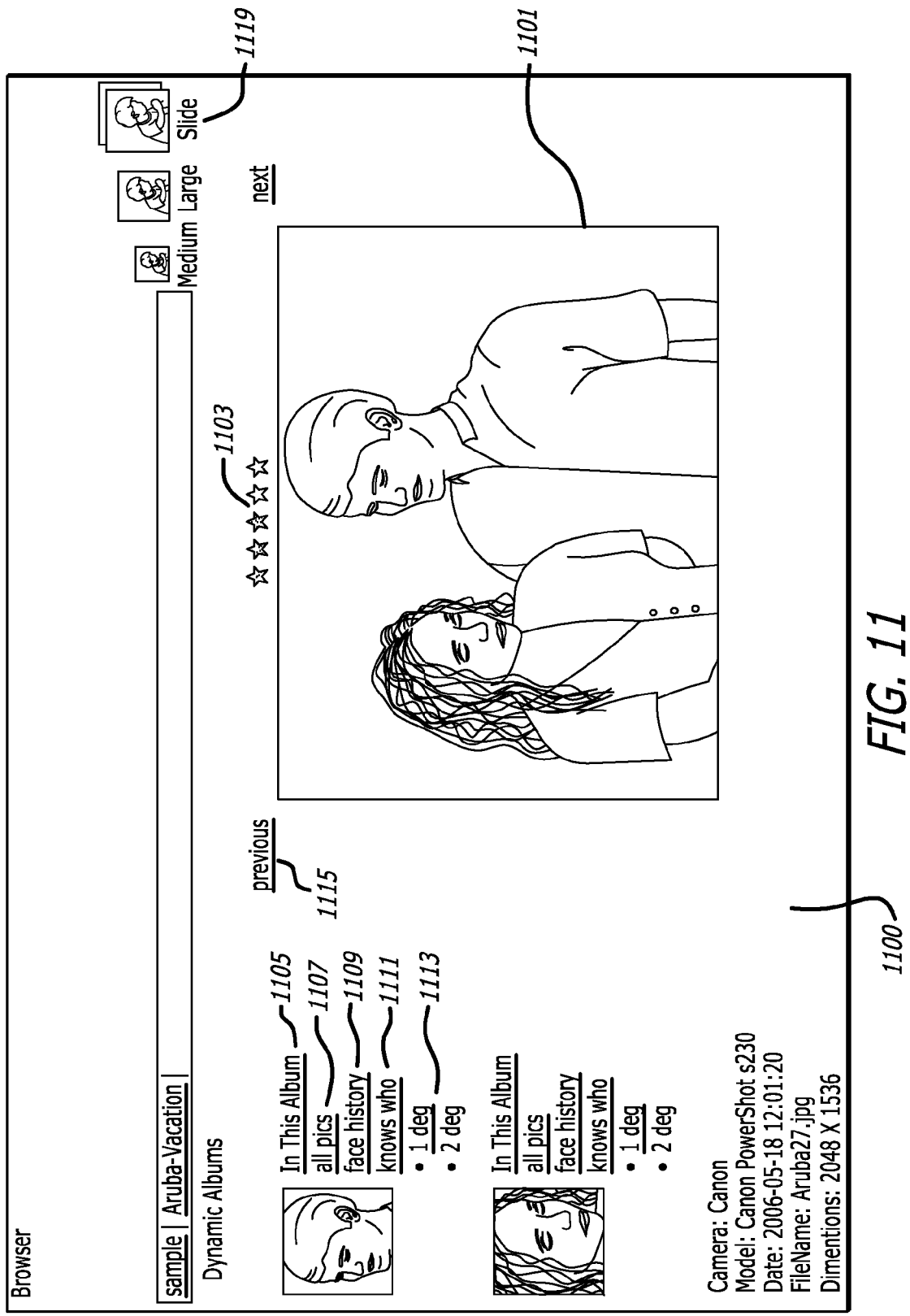
FIG. 11 is a diagram of one embodiment of an album viewing interface.

FIG. 11 is a diagram of one embodiment of an album viewing interface. In one embodiment, an album viewing interface may be accessed by selecting an album to view from the various album listing interfaces. A user may also view dynamic albums using this interface. As used herein a dynamic album is an album that is generated dynamically from a collection of pictures across one or many albums or across one or many users based on particular criteria using tools provided by the system (dynamic generation as used here is different and should not be confused with a dynamically generated xml page of otherwise static images information). For example, a user may view a dynamic album of all images of a particular character or all images containing any one of a cast of characters.

In one embodiment, the album viewing interface may display images 1101 one at a time in a slide show type format or similar format. In another embodiment, multiple images may be displayed simultaneously in a grid pattern or similarly displayed. A user or viewer may designate a format for displaying images and similar information by selecting a theme.

In one embodiment, an image may have a rating meter 1103 such as a star rating or similar rating mechanism. A user, permitted viewer or the public may be able to view and provide a rating of each image. The user may also select the type of rating mechanism and any related description indicating the meaning of the rating. The album viewing interface may also provide image advancement or viewing controls 1115 that allow a user or viewer to cycle through the images of an album or similarly navigate the images of an album. In one embodiment, a control 1119 may be provided to set or adjust the size of the displayed image. For example, the user or viewer may set the images to be shown in small, medium or large formats.

In one embodiment, each image may have related information displayed through the interface. In one embodiment, each of the characters in the image being displayed may be shown by the portrait 1117 from the image. A user interface element may be provided to allow a viewer to access additional information and images related to the character. In this manner, the albums may become dynamic as the viewer is able to define the images to be viewed and navigate the available images based on the identity of the users in the images.

In one embodiment, other user interface elements may provide access to other images of an individual in the same album 1105, show all images of an individual 1107, show a timeline or history of portraits for a character 1109, show a listing of other characters that this character knows or has appeared in an image with 1111, show a listing of characters that have appeared in images of other characters that this character has appeared with in images. Any number of degrees of separation may be selected to show relationships or associations with other characters and the images they appear in.

Figure 12:
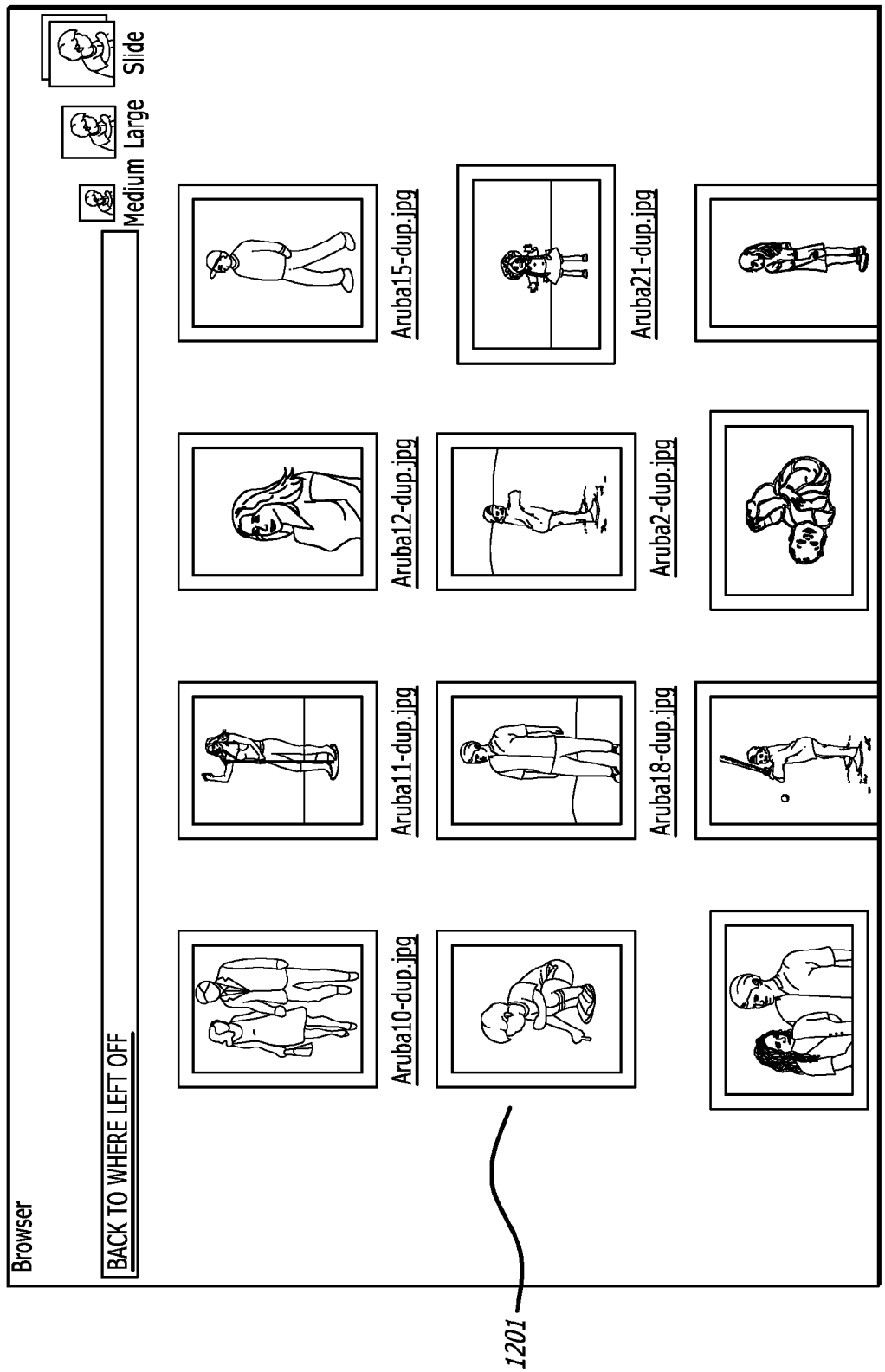
FIG. 12 is a diagram of one embodiment of an interface for displaying images.

FIG. 12 is a diagram of one embodiment of an interface for displaying images. In one example, a user or viewer may select to see all images of a character in an album or all images of a character available in an account or publicly available. The images may be displayed in a grid like pattern 1201 or may be displayed as a slideshow or similarly displayed. For example, this interface may be reached by the selection of the 'all pics' or 'In This Album' user interface elements.

Figure 13:
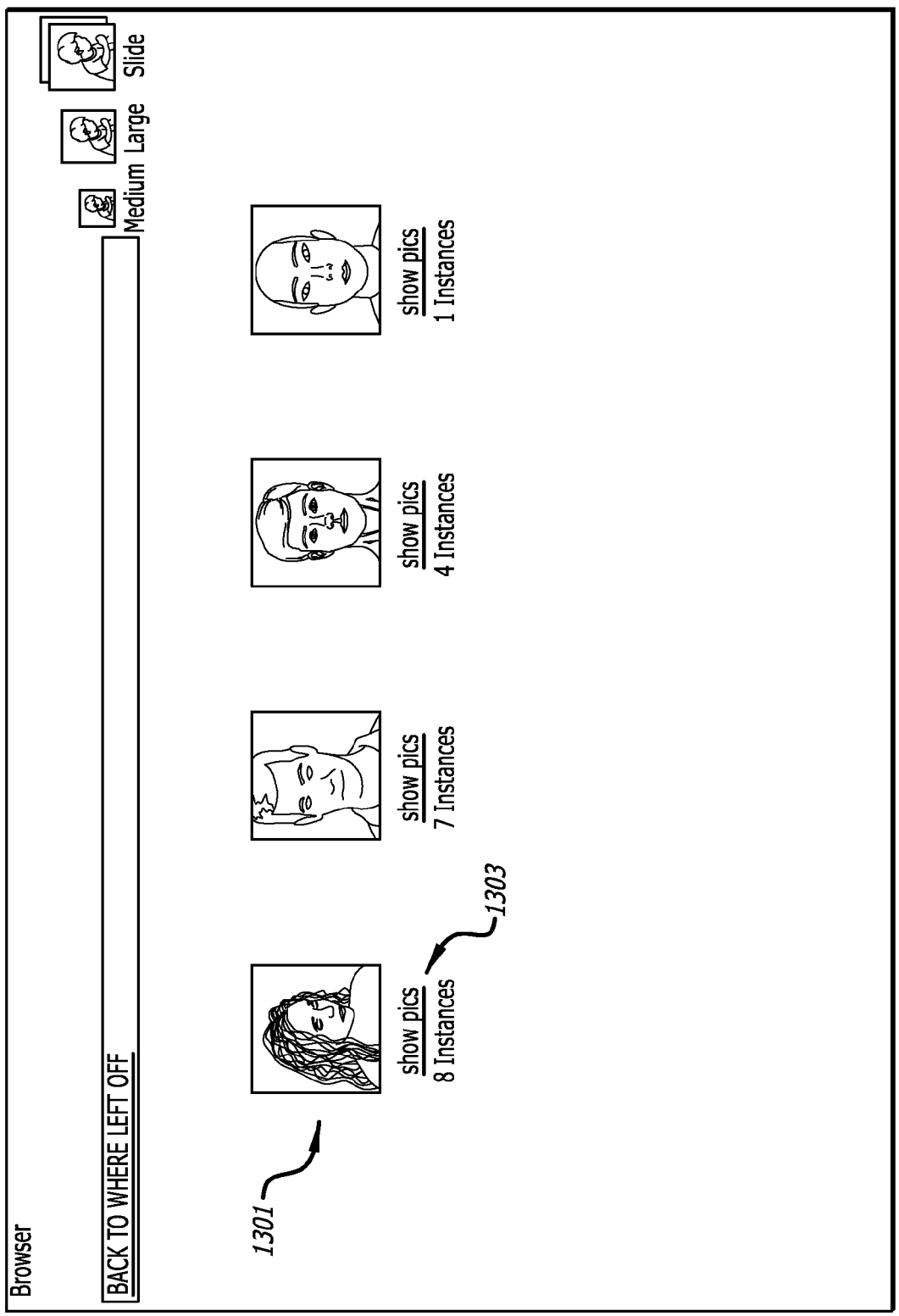
FIG. 13 is a diagram of one embodiment of an interface for viewing a list of characters that are known to a selected character.

FIG. 13 is a diagram of one embodiment of an interface for viewing known characters. In one embodiment, an interface for presenting a set of characters who have appeared in an image with a selected character may be accessed through a 'knows who' or similar user interface element. In one example embodiment, an image or portrait 1301 may be displayed to indicate each known character along with a user interface element 1303 to access the images of each character may be provided. In one embodiment, other information about each character may be provided such as name, number of images, contact information or similar information. In a further embodiment, a mechanism may be presented for selecting multiple characters to find images with each of the selected characters.

Figure 14:
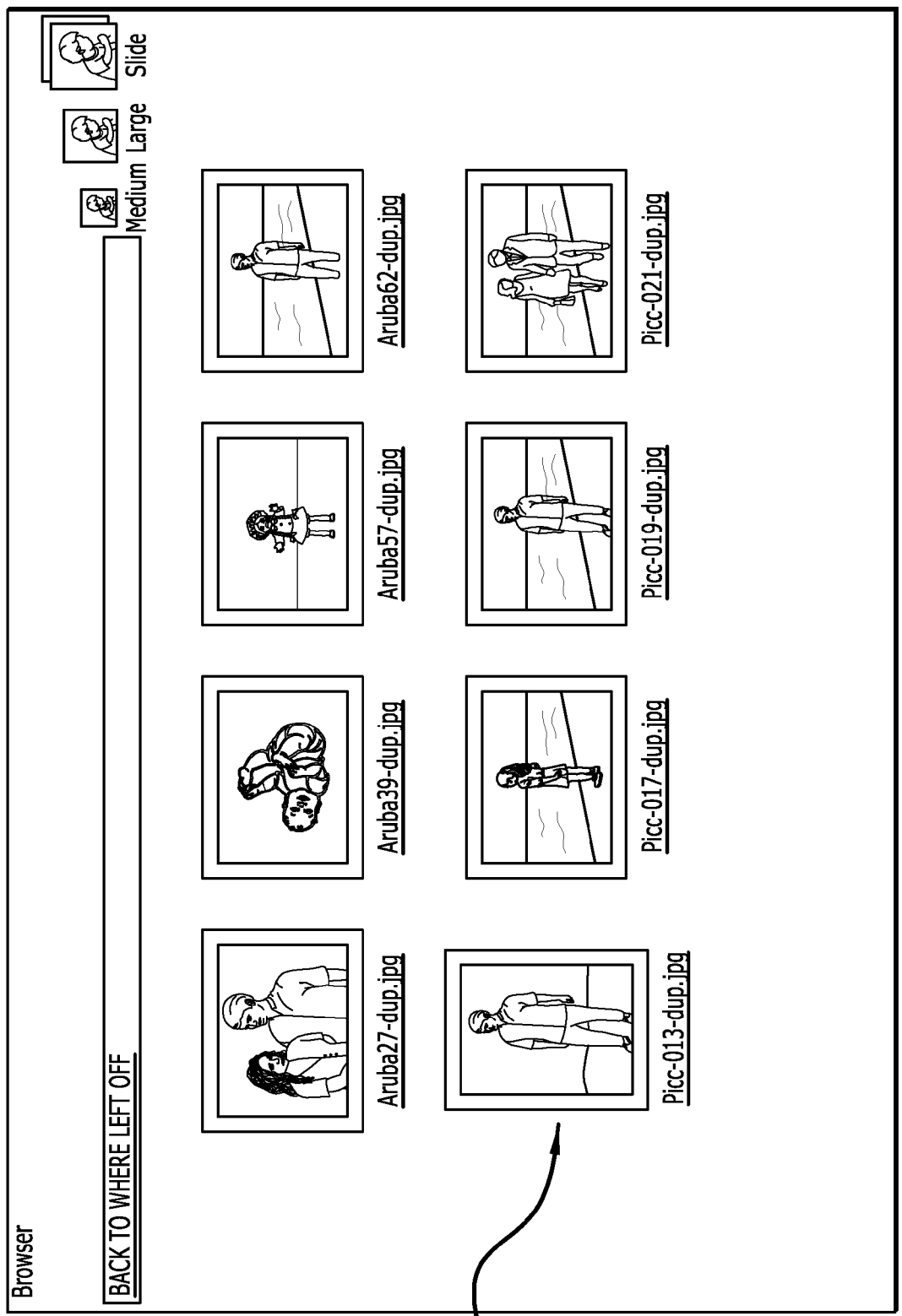
FIG. 14 is a diagram of one embodiment of an interface for viewing images of known characters in combination.

FIG. 14 is a diagram of one embodiment of an interface for viewing images of known characters. In one embodiment, a user or viewer may view a set of images 1401 with two or more designated characters. For example, these images may be selected by using the 'knows who' option and selecting one or more characters from the interface of known characters. These images may be displayed in a grid patter, slideshow or similar layout or presentation.

Figure 15:
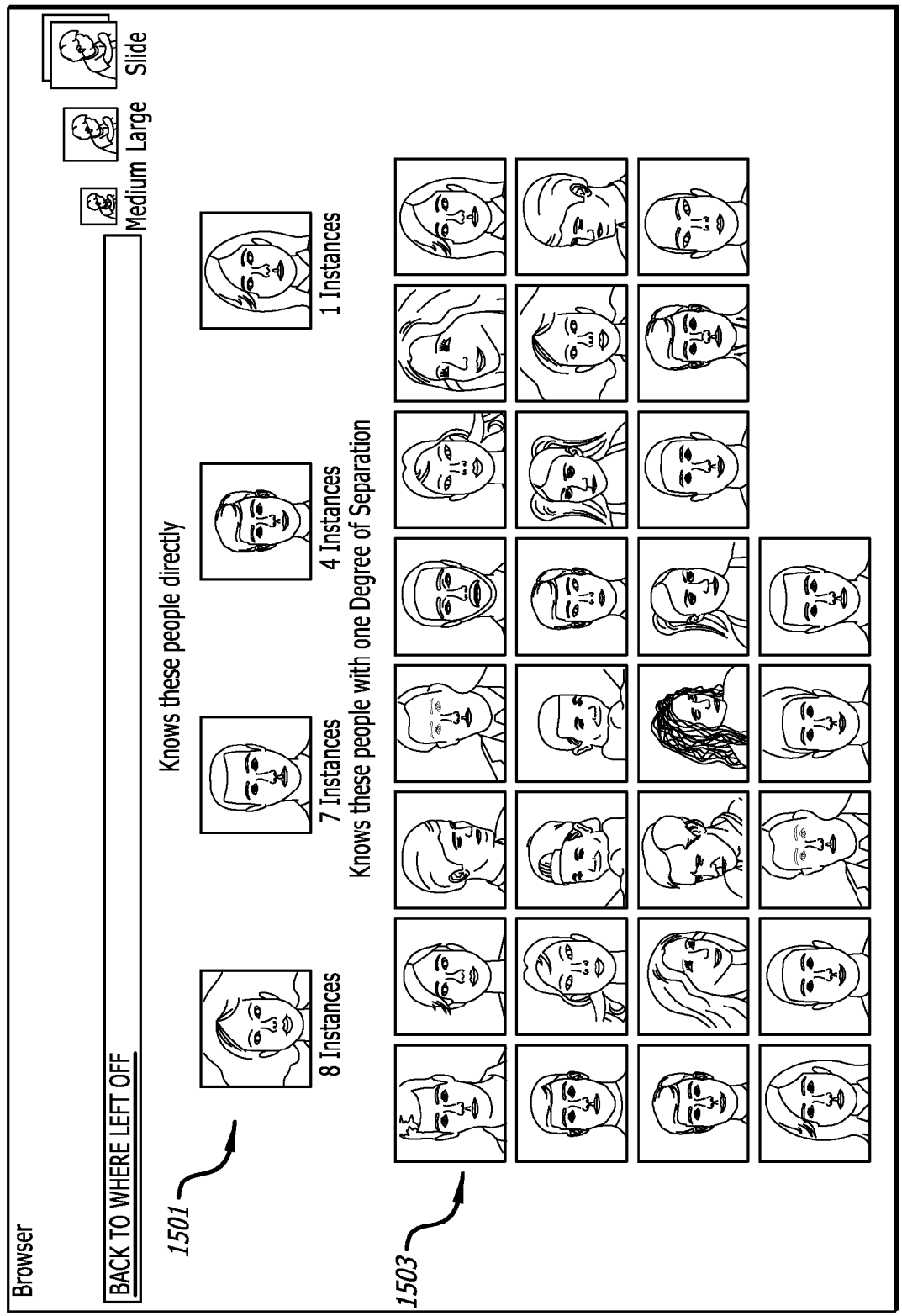
FIG. 15 is a diagram of one embodiment of an interface for viewing characters known by their degree of separation.

FIG. 15 is a diagram of one embodiment of an interface for viewing characters known by their degree of separation. In one embodiment, the system may generate an interface for viewing each of the characters indirectly known to a selected character by the degree of separation. This interface may be accessed through the viewing interface by selecting a degree of separation to be viewed.

In one embodiment, the degree of separation interface may display portraits, images or other representations of directly and indirectly known individuals. These images or representations may be displayed in any order or layout. In one example embodiment, a set of individuals who are known directly to a selected character may be shown at the top of the interface 1501. Characters known at each additional degree of separation may be shown in a section below 1503 in order of the degree of separation from the selected character or in a similar layout.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention. Thus, if a feature is described with reference to one embodiment it may be used with another.

Further one skilled in the art would appreciate that additional functionality may be obtained from the inherent properties of the system based on the detection and tracking of the relationships between individuals in the image collections including using Boolean logic to generate dynamic albums and collections of images based on a selection of characters who the viewer desires to see or wishes to exclude from viewing. For example, a viewer may select so see all image available for a first character except for images containing a second character. This logic may also be used to edit or redefine albums or image collections. Thus collections of images defined by the Boolean logic may be saved as distinct albums.

Further, the system may scale to a dramatic scale with the linking of images across the accounts of multiple users who have made their individual collections public. The system may provide a set of interfaces for viewing events that may have been witnessed and captured by multiple users. For example, a large number of users may have attended an event such as the Olympics and made their images of the event public. A viewer may brows these images by selecting the characters, in this example, athletes in competition, to see all of the images related to the event in a dynamic album that utilizes images from a large number of user accounts.

In one embodiment, the image management system may be implemented partially or entirely as hardware devices, such as application specific integrated circuits (ASICs). In another embodiment, these components may be implemented in software (e.g., microcode, assembly language or higher level languages). These software implementations may be stored on a machine-readable medium. A "machine readable" medium may include any medium that can store or transfer information. Examples of a machine readable medium include a ROM, a floppy diskette, a CD-ROM, a DVD, flash memory, hard drive, an optical disk or similar medium.

In the foregoing specification, the embodiments of the invention have been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

I claim:

1. A method comprising:
   receiving a first image of an individual;
   identifying the individual in the image with a face detection module of a computer system;
   storing a relationship between the identified individual and the first image in a storage system of the computer system;
   searching for a second image and a third image of the identified individual with a portrait matching module of the computer system; and
   displaying the first image, a first link to a first webpage for an album containing the second image of the identified individual and a second link to a second webpage for all images of the indentified individual in the storage system, the nd webpage containing the second image and the third image of the identified individual, wherein the first webpage provides a display interface of only the images of the identified individual within the album including the second image and excluding the third image.

2. The method of claim 1, further comprising:
   displaying an interface for uploading the first image.

3. The method of claim 1, wherein identifying the individual in the first image comprises:
identifying a face of the individual in the first image.

4. The method of claim 1, wherein searching for the second image of the individual comprises:
searching a database of faces for matching faces.

5. The method of claim 1, further comprising:
retrieving a plurality of images based on matching links indicating the identified individual is present in each of the plurality of images.

6. The method of claim 1, further comprising:
identifying a plurality of individuals in the first image; and
storing a link for each of the individuals indicating that each of the individuals is in the first image.

7. The method of claim 1, further comprising:
sorting images based on a relationship between a selected individual and an individual in each image; and
displaying images including related individuals.

8. The method of claim 7, wherein the relationship is defined by the selected individual and another individual being present in a same image.

9. The method of claim 1, further comprising:
presenting an interface to display an unidentified individual in the first image and receive an indicator of an identity of the unidentified individual to be stored in a database.

10. The method of claim 1, further comprising:
generating a portrait of a face of the identified individual identified in the first image.

11. The method of claim 7, wherein the relationship is an indirect relationship defined by a degree of separation between a selected individual and an individual in an image, where the degree of separation is greater than one.

12. The method of claim , further comprising:
restricting searches to images designated as related to an event.

13. The method of claim 12, wherein the event is organized as an album of images.

14. The method of claim 1, further comprising:
searching a set of images for images depicting another individual with a relationship to the identified individual in the first image; and
providing a navigation interface to access the images depicting another individual without inputting a name.

15. The method of claim 1, further p sing:
searching for a related individual based on a number of images in which the individual and related individual are depicted.

16. An apparatus comprising:
means for receiving an image of a first individual;
means for processing an image to locate the first individual in the image;
means for searching a database to identify the first individual;
means for storing an indication that the image includes the first individual; and
means for searching for other images of the first individual including a second image and a third image of the first individual; and
means for displaying the image, a first link to a first webpage for an album containing the second image and excluding the third image and a second link to a second webpage for all images of the first individual in the database, the second webpage containing the second image and the third image of the first individual.

17. The apparatus of claim 16, further comprising:
means for displaying a set of images including an unidentified individual.

18. The apparatus of claim 16, further comprising:
means for searching for images having a second individual with a link to the first individual, the link based on the first individual and the second individual being in the image.

19. A non-transitory computer readable medium having a set of instructions stored therein which when executed cause the computer to perform a set of operations comprising:
processing a set of images to detect a first face in a first image, a second image and a third image;
searching a database of recognized faces to match a detected face from the first image, the second image and the third image;
storing a link of the face in the first image, second image and third image to a first individual having the first face; and
displaying a first webpage of the first image, a first link to a second webpage an album containing the second image and excluding the third image and a second link to a third webpage for all images of the first individual including the first image, the second image and the third image.

20. The non-transitory computer readable medium of claim 19, having further instruction stored therein which when executed cause the computer to perform a set of operations comprising:
generating an interface to display unidentified faces.

21. The non-transitory computer readable medium of claim 19, having further instructions stored therein which when executed cause the computer to perform a set of operations comprising:
generating a display of images including the first face and images containing a second face, the second face appearing in at least one image with the first face.

* * * * *

UNITED STATES PATENT AND TRADEMARK OFFICE
CERTIFICATE OF CORRECTION

| | | |
|---|---|---|
| PATENT NO. | : 7,916,976 B1 | Page 1 of 1 |
| APPLICATION NO. | : 11/704056 | |
| DATED | : March 29, 2011 | |
| INVENTOR(S) | : Roland H. Kedikian | |

It is certified that error appears in the above-identified patent and that said Letters Patent is hereby corrected as shown below:

In the Claims, in Column 12, Claim 1, line 60, please delete "nd" and insert --second--.

In Column 13, Claim 12, line 34, please delete "claim" and insert --claim 1--.

In Column 13, Claim 15, line 45, please delete "p sing" and insert --comprising--.

In Column 14, Claim 19, line 34, please insert --for-- between "webpage" and "an album".

Signed and Sealed this
Ninth Day of August, 2011

David J. Kappos
*Director of the United States Patent and Trademark Office*